(12) United States Patent
Yoon et al.

(10) Patent No.: US 6,775,050 B2
(45) Date of Patent: Aug. 10, 2004

(54) MICROMIRROR ACTUATOR (75) Inventors: Euisik Yoon, Daejeon (KR); Jun-Bo Yoon, Daejeon (KR); Hyung-Kew Lee, Gunpo (KR); Ji-Hyuk Kim, Seoul (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 10/437,290

(22) Filed: May 14, 2003

(65) Prior Publication Data
US 2003/0223103 A1 Dec. 4, 2003

(30) Foreign Application Priority Data
May 28, 2002 (KR) .................. 10-2002-0029546

(51) Int. Cl.⁷ .................. G02B 26/00; G02B 26/08
(52) U.S. Cl. .................. 359/291; 359/295; 359/224
(58) Field of Search .................. 359/290, 291, 359/295, 298, 223, 224, 280–282, 198, 199, 214, 230, 237; 438/52, 72; 310/22, 36, 90

(56) References Cited

U.S. PATENT DOCUMENTS

| | | | |
|---|---|---|---|
| 5,485,304 A | * 1/1996 | Kaeriyama | 359/291 |
| 5,523,878 A | * 6/1996 | Wallace et al. | 359/290 |
| 5,629,794 A | * 5/1997 | Magel et al. | 359/290 |
| 6,259,548 B1 | 7/2001 | Tsugai et al. | 359/224 |
| 6,300,156 B1 | 10/2001 | Decker et al. | 438/52 |
| 6,300,619 B1 | 10/2001 | Aksyuk et al. | 250/216 |
| 6,359,718 B1 | 3/2002 | Lin et al. | 359/224 |

* cited by examiner

Primary Examiner—Georgia Epps
Assistant Examiner—William Choi
(74) Attorney, Agent, or Firm—Oliff & Berridge, PLC (57) ABSTRACT Disclosed is a micromirror actuator that includes: a substrate provided with an insulating layer formed thereon; two lower columns spaced from each other by a designated distance, and formed on the insulating layer; a first torsion bar extending over upper surfaces of the lower columns; a second torsion bar formed so that the first and second torsion bars are orthogonal to each other; four electrodes, each disposed in four areas formed by the orthogonal crossing of the first and second torsion bars, formed on the insulating layer; two upper columns formed on an upper surface of the second torsion bar so that the upper surfaces of the upper columns are located at higher positions than the upper surfaces of the electrodes; and a micromirror located on the upper surfaces of the upper columns so that the micromirror is supported by the upper columns.

7 Claims, 7 Drawing Sheets

MICROMIRROR ACTUATOR

BACKGROUND OF THE INVENTION

1. Field of the Invention

The present invention relates to a micromirror actuator, and more particularly to a micromirror actuator with the degrees of freedom of two axes operated by an electrostatic force.

2. Description of the Related Art

Recently, in order to satisfy data transmission requirement in optical communication, wavelength division multiplexing (WDM) networks have been vigorously developed. Thus, since transmission capacity of each wavelength and the number of wavelengths transmitted via a single optical fiber are increased, an optical switch comprising an increased number of pots has been required. Conventional plane waveguides have high optical loss and are large in size. Accordingly, a small-sized micromirror with small optical loss has been developed using a MEMS (Micro-Electro-Mechanical System) technique.

Most of the micromirrors for a three-dimensional optical switch using the MEMS technique are operated by an electrostatic force generated between a reflective surface of the micromirror and an electrode located under the micromirror, and formed in a gimbal structure using an external frame so as to operate two axes in the micromirror. Lucent Technologies Inc. in U.S. discloses the above structure of the micromirror by U.S. patents (U.S. Pat. Nos. 6,300,156 and 6,300,619) in 2001.

Since the micromirror proposed by Lucent Technologies Inc. comprises a sacrificial layer with a small height, the reflective surface of the micromirror should be elevated to a height of several tens of $\mu$m by means of an external actuator. Further, since a torsion bar is attached to the micromirror adjacent to the reflective surface, the dimensions of the total structure of the micromirror are larger than that of a portion of the micromirror by which light is actually reflected. Accordingly, it is difficult to densely dispose a plurality of the micromirrors close to each other.

SUMMARY OF THE INVENTION

Therefore, the present invention has been made in view of the above problems, and it is an object of the present invention to provide a micromirror actuator, in which a micromirror is elevated to a desired height and the dimensions of its structure are reduced.

In accordance with the present invention, the above and other objects can be accomplished by the provision of a micromirror actuator comprising: a substrate provided with an insulating layer formed thereon; two lower columns spaced from each other by a designated distance, and formed on the insulating layer; a first torsion bar extending over upper surfaces of the lower columns; a second torsion bar formed so that the first and second torsion bars are orthogonal to each other; four electrodes, each disposed in four areas formed by the orthogonal crossing of the first and second torsion bars, formed on the insulating layer; two upper columns formed on an upper surface of the second torsion bar so that upper surfaces of the upper columns are located at higher positions than upper surfaces of the electrodes; and a micromirror located on the upper surfaces of the upper columns so that the micromirror is supported by the upper columns.

Preferably, heights of the electrodes or heights of the upper columns may be varied according to a desired tilted angle of the micromirror.

Further, preferably, the upper surfaces of the electrodes may be rectangular-shaped, quarter circular-shaped, or fan-shaped.

Moreover, preferably, the first and second torsion bars may be straight or curved.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 1A:
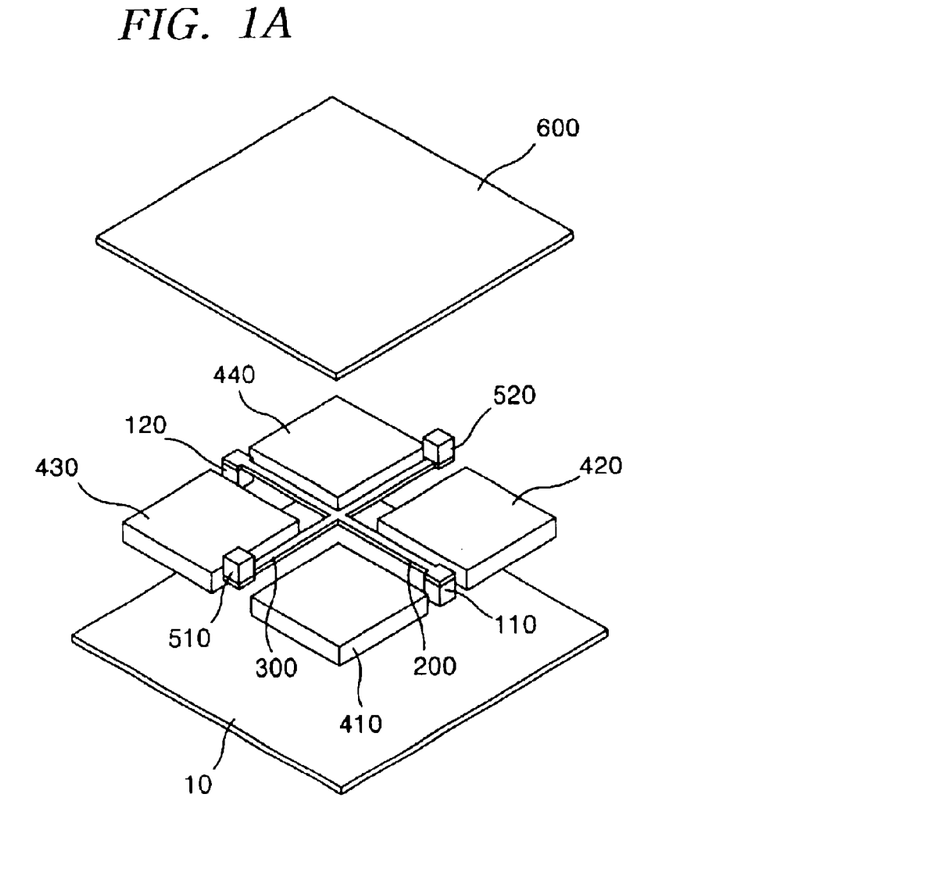
FIG. 1A is an exploded perspective view of a micromirror actuator in accordance with a preferred embodiment of the present invention.
Figure 1B:
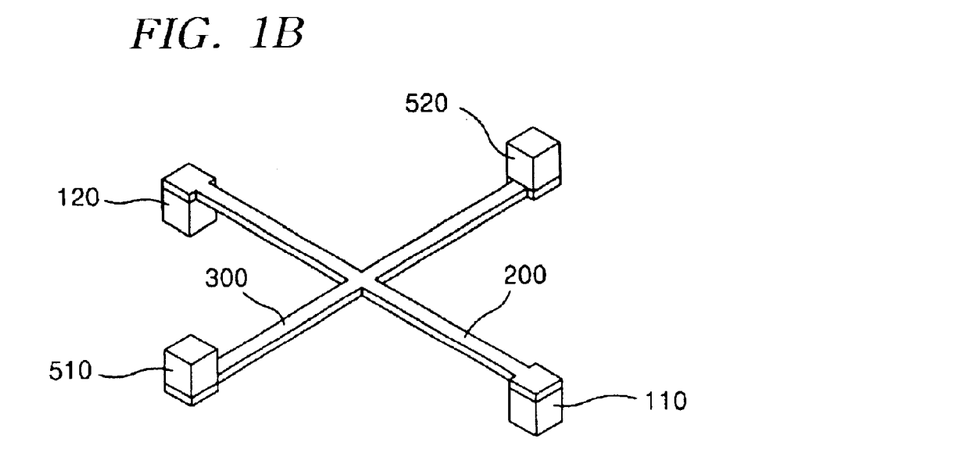
FIG. 1B is a perspective view illustrating torsion bars of the micromirror actuator of FIG. 1A.
Figure 2A:
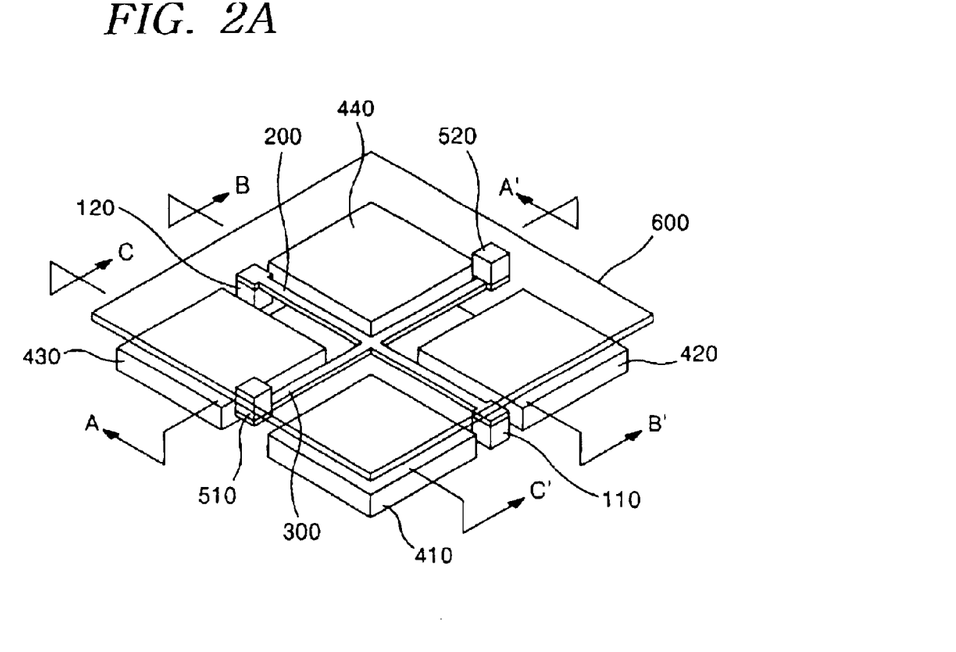
FIGS. 2A to 2C illustrate the operation of the micromirror actuator of FIG. 1A.
Figure 2B:
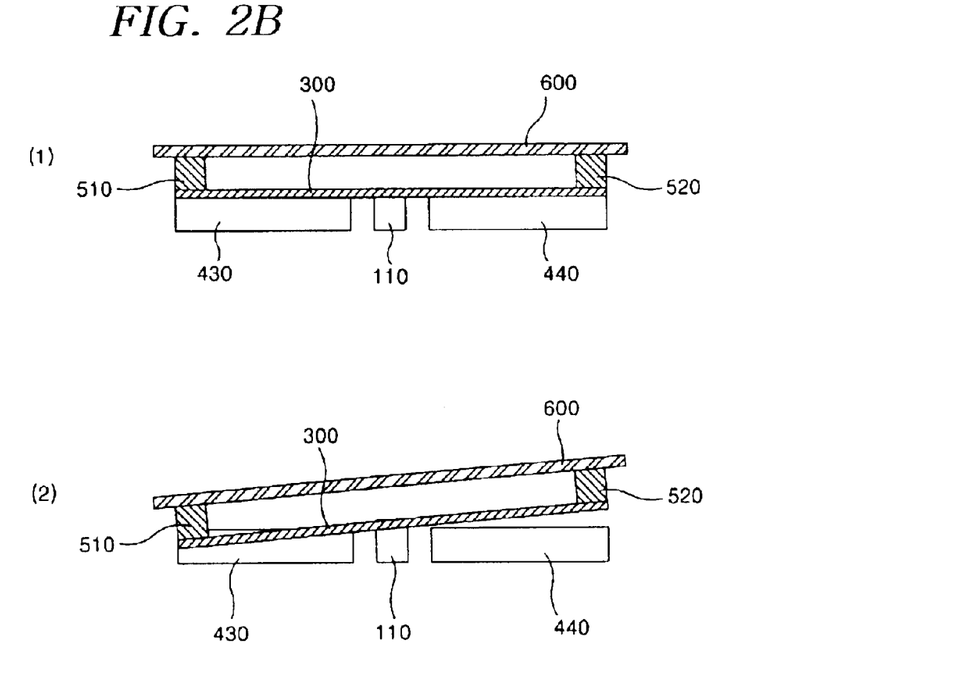
Figure 2C:
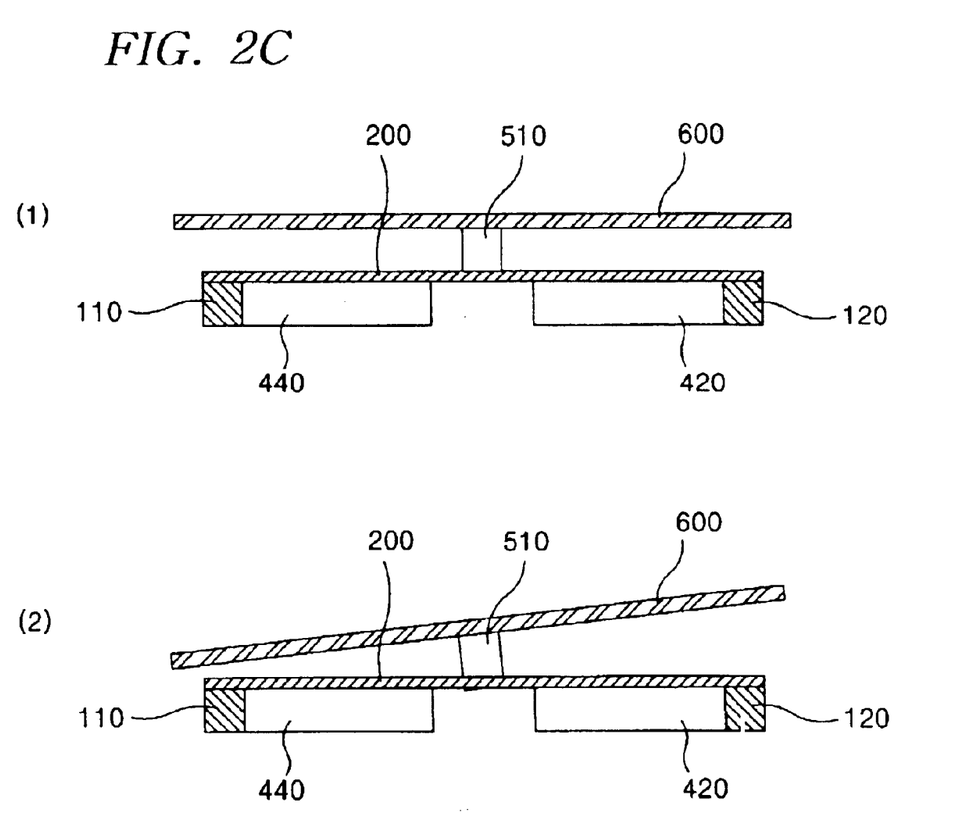

FIG. 1A is an exploded perspective view of a micromirror actuator in accordance with a preferred embodiment of the present invention. FIG. 1B is a perspective view illustrating torsion bars of the micromirror actuator of FIG. 1A. FIGS. 2A to 2C illustrate the operation of the micromirror actuator of FIG. 1A. FIGS. 3A to 3E illustrate a method for manufacturing the micromirror actuator in accordance with a preferred embodiment of the present invention.

With reference to FIGS. 1A and 1B, a micromirror actuator in accordance with the present invention comprises a substrate 10, two lower columns 110 and 120, a first torsion bar 200, a second torsion bar 300, four electrodes 410, 420, 430 and 440, two upper column 510 and 520, and a micromirror 600.

The substrate 10 is made of a silicon wafer. An insulating layer (not shown) is formed on one surface of the substrate 10.

The two lower columns 110 and 120 are spaced from each other by a designated distance and formed on the insulating layer.

The first torsion bar 200 extends over the upper surfaces of the two lower columns 110 and 120 so that the lower surfaces of both ends of the first torsion bar 200 are respectively located on the upper surfaces of the two lower columns 110 and 120. That is, the first torsion bar 200 is supported by the two lower columns 110 and 120.

The second torsion bar 300 is orthogonal to the first torsion 200. Here, a crossing area between the first torsion bar 200 and the second torsion bar 300 is included by both the first torsion bar 200 and the second torsion bar 300.

Although the first torsion bar 200 and the second torsion bar 300 are straight in this embodiment, the first torsion bar 200 and the second torsion bar 300 are not limited in these shapes, but may be curved so long as they can be distorted by an electrostatic force with low voltage.

The four electrodes 410, 420, 430, and 440 are formed on the insulating layer so that one electrode is disposed in each of four areas formed by the orthogonal crossing of the first and second torsion bars 200 and 300. Accordingly, the one electrode 410 faces a further electrode 420 centering on the first torsion bar 200, and faces another electrode 430 centering on the second torsion bar 300. Further, the electrode 410 faces the final electrode 440 centering on the crossing point of the first and second torsion bars 200 and 300. Although the upper surfaces of the four electrodes 410, 420, 430, and 440 are rectangular-shaped in the drawings, the four electrodes 410, 420, 430, and 440 are not limited thereto, but may quarter circular-shaped or fan-shaped so long as that the operation range of a designated area in the electrode is can be increased even by the same voltage.

The two upper columns 510 and 520 are respectively formed on the upper surface of both ends of the second torsion bar 300 so that the upper surfaces of the two upper columns 510 and 520 are located at higher positions than the upper surfaces of the four electrodes 410, 420, 430, and 440.

The micromirror 600 is located on the upper surfaces of the two upper columns 510 and 520 so that the micromirror 600 is supported by the two upper columns 510 and 520.

The first torsion bar 200, the second torsion bar 300, and the four electrodes 410, 420, 430, and 440 are made of copper (Cu), nickel (Ni), gold (Au), or etc. Therefore, when voltage is applied only to ones selected from the four electrodes 410, 420, 430, and 440, the first torsion bar 200 or the second torsion bar 300 is selectively distorted by an electrostatic force, and then the micromirror 600 is tilted.

The micromirror 600 is made of a conductive material such as copper (Cu), nickel (Ni), gold (Au), etc., or made of single crystalline silicon, or polycrystalline silicon, so that the first torsion bar 200 and the second torsion bar 300 are apt to be well distorted by the electrostatic force.

In order to vary the tilted angle of the micromirror 600, the heights of the four electrodes 410, 420, 430, and 440 and two torsion bars 200 and 300 or the heights of the two upper columns 510 and 520 may be changed, i.e., increased or decreased.

Hereinafter, with reference to FIGS. 2A to 2C, the operation of the micromirror actuator in accordance with the preferred embodiment of the present invention is described.

In FIG. 2A, the micromirror 600 is illustrated as being transparent for the convenience of illustration.

FIGS. 2B(1) and (2) are cross-sectional views, taken along the line A–A' of FIG. 2A, illustrating the operation of the micromirror actuator when voltage is applied only to the two electrodes 410 and 430 facing each other centering on the second torsion bar 300.

With reference to FIGS. 2B(1) and (2), when voltage is applied only to the two electrodes 410 and 430 facing each other centering on the second torsion bar 300, the first torsion bar 200 is distorted so that an area of the first torsion bar 200 adjacent to the two electrodes 410 and 430 is lowered and the opposite area of the first torsion bar 200 is elevated. Accordingly, the second torsion bar 300 and the micromirror 600 are tilted centering on the first torsion bar 200.

FIGS. 2C(1) and (2) are cross-sectional views, taken along the line B–B' of FIG. 2A, illustrating the operation of the micromirror actuator when voltage is applied only to the two electrodes 430 and 440 facing each other centering on the first torsion bar 200.

With reference to FIGS. 2C(1) and (2), when voltage is applied only to the two electrodes 430 and 440 facing each other centering on the first torsion bar 200, the second torsion bar 300 is distorted so that an area of the second torsion bar 300 adjacent to the two electrodes 430 and 440 is lowered and the opposite area of the second torsion bar 300 is elevated. Accordingly, the first torsion bar 200 and the micromirror 600 are tilted centering on the second torsion bar 300.

Thus, as shown in FIGS. 2B and 2C, the micromirror 600 is operated with the degree of freedom of two axes, i.e., the first and second torsion bars 200 and 300. Although FIGS. 2B and 2C show the operation of the micromirror when voltage is applied to two electrodes, if necessary, voltage may be applied to only one electrode.

Figure 3A:
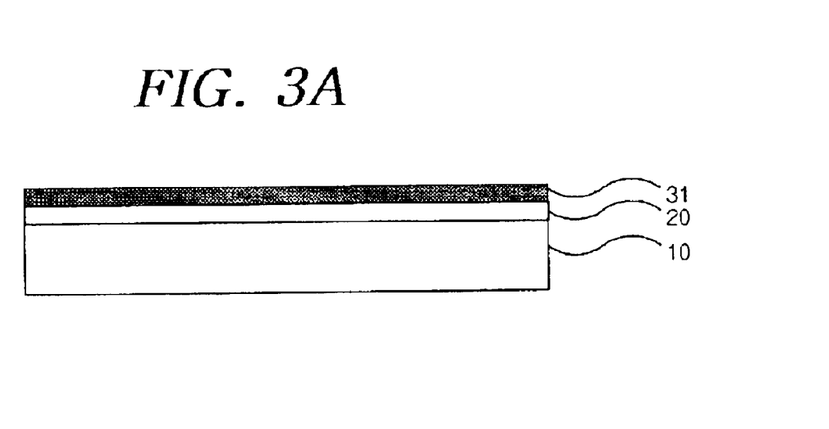
FIGS. 3A to 3E illustrate a method for manufacturing the micromirror actuator in accordance with a preferred embodiment of the present invention.
Figure 3B:
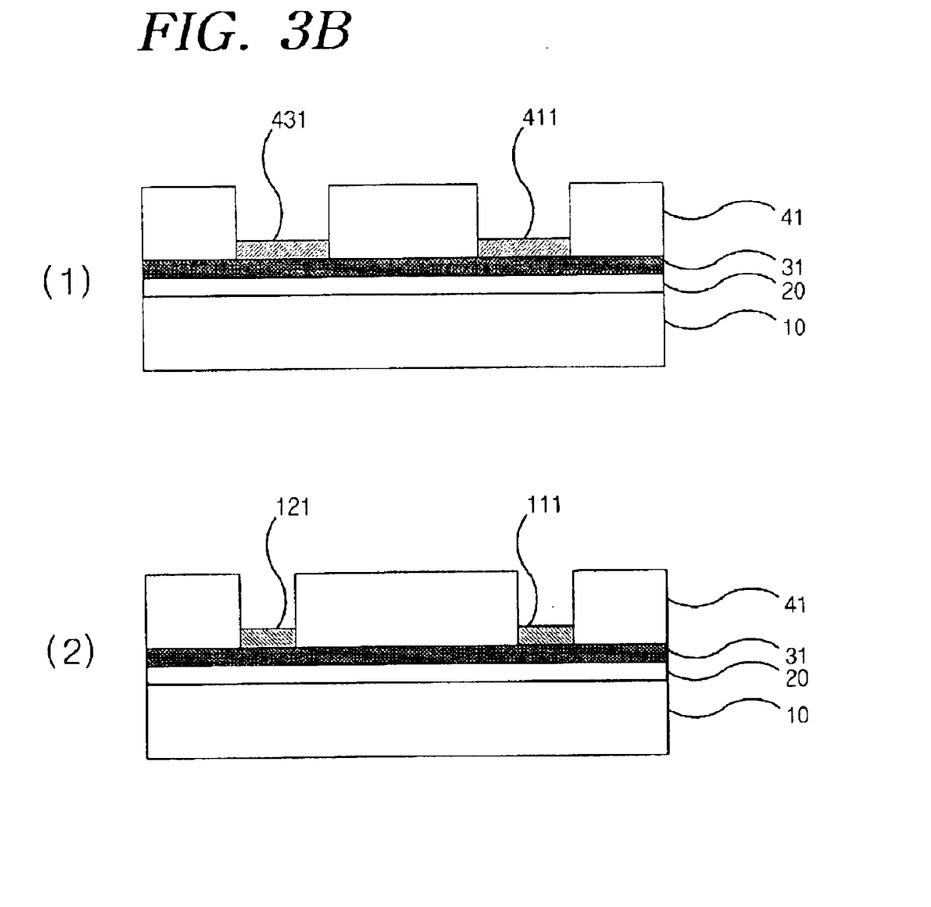
Figure 3C:
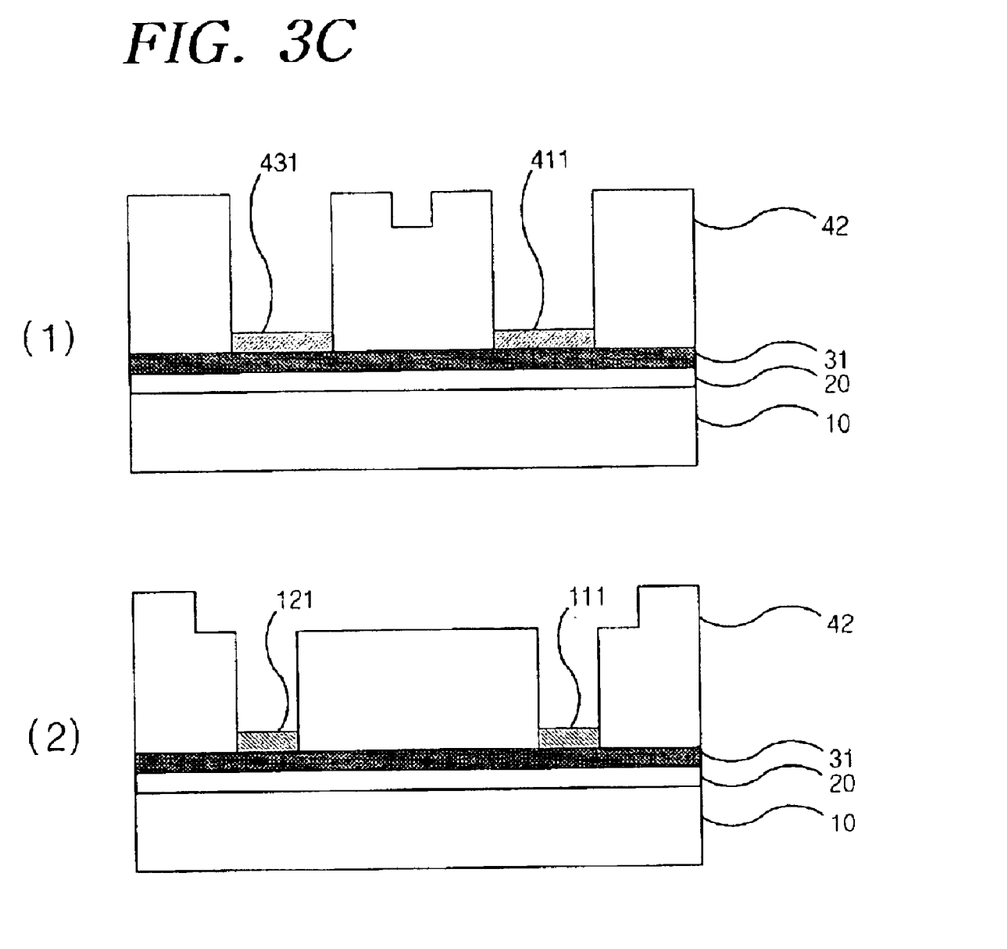

Hereinafter, with reference to FIGS. 3A to 3E, a method for manufacturing the micromirror actuator in accordance with the preferred embodiment of the present invention is described. FIGS. 3A, 3B, 3C(1), 3D(1) and (2), and 3E(1) are cross-sectional views, taken along the line C–C' of FIG. 2A, illustrating the manufacturing method. FIGS. 3C(2), 3D(3), and 3E(2) are cross-sectional views, taken along the line B–B' of FIG. 2A, illustrating the manufacturing method.

As shown in FIG. 3A, an insulating layer 20 made of silicon dioxide is grown on the silicon wafer 10 by thermal oxidation. Then, a Ti/Cu seed layer 31 is deposited on the insulating layer 20. The Ti/Cu seed layer 31 serves to plate electrodes, which are described below, with copper (Cu). Accordingly, the seed layer may be made of various materials according to a desired plating material.

As shown in FIG. 3B, a photoresist 41 (hereinafter, referred to as a "first photoresist") is formed on the seed layer 31 by photolithography using a first mask, and then etched at four electrode regions and two lower column regions. The etched four electrode regions and two lower column regions are plated so as to form four electrode layers (shown in only two layers 411 and 431; hereinafter, referred to as "first electrode layers") and two lower columns 111 and 121 (hereinafter, referred to as "first lower columns).

Then, the first photoresist 41 is removed using an acetone solution, and another photoresist 42 (hereinafter, referred to as a "second photoresist") with a thickness larger than that of the first photoresist 41 is formed thereon. For example, when the second photoresist 42 is made of AZ9260 photosensitive resin, the second photoresist 42 with a thickness of approximately 100 µm is obtained. The second photoresist 42 is required to further form second electrode layers 412 and 432, which are described below, so as to increase the total height of the electrode layers, and to form second lower columns and the first torsion bar 200. The thickness of the second photoresist 42 can be varied according to a desired maximally tilted angle of the micromirror 600.

A second mask, in which shapes of the first and second torsion bars in the orthogonal relation, third electrode layers and third lower columns are patterned, is located on the second photoresist 42, and ultraviolet light is irradiated thereon to penetrated to a shallow depth. Then, a third mask, in which shapes of the second electrode layers and the second lower columns are patterned, is located thereon, and ultraviolet light is irradiated thereon to penetrate to a great depth. The second photoresist 42 is removed at designated areas so that the upper surfaces of the first electrode layers 411 and 431 and the upper surfaces of the first lower columns 111 and 112 are exposed, and first and second torsion bar regions (with reference to FIGS. 3C(1) and (2)) are formed. Here, the shapes of the third lower columns patterned in the second mask are actually included by the first torsion bar, and denote the connection between the second lower columns and the first torsion bar in a subsequent step.

Figure 3D:
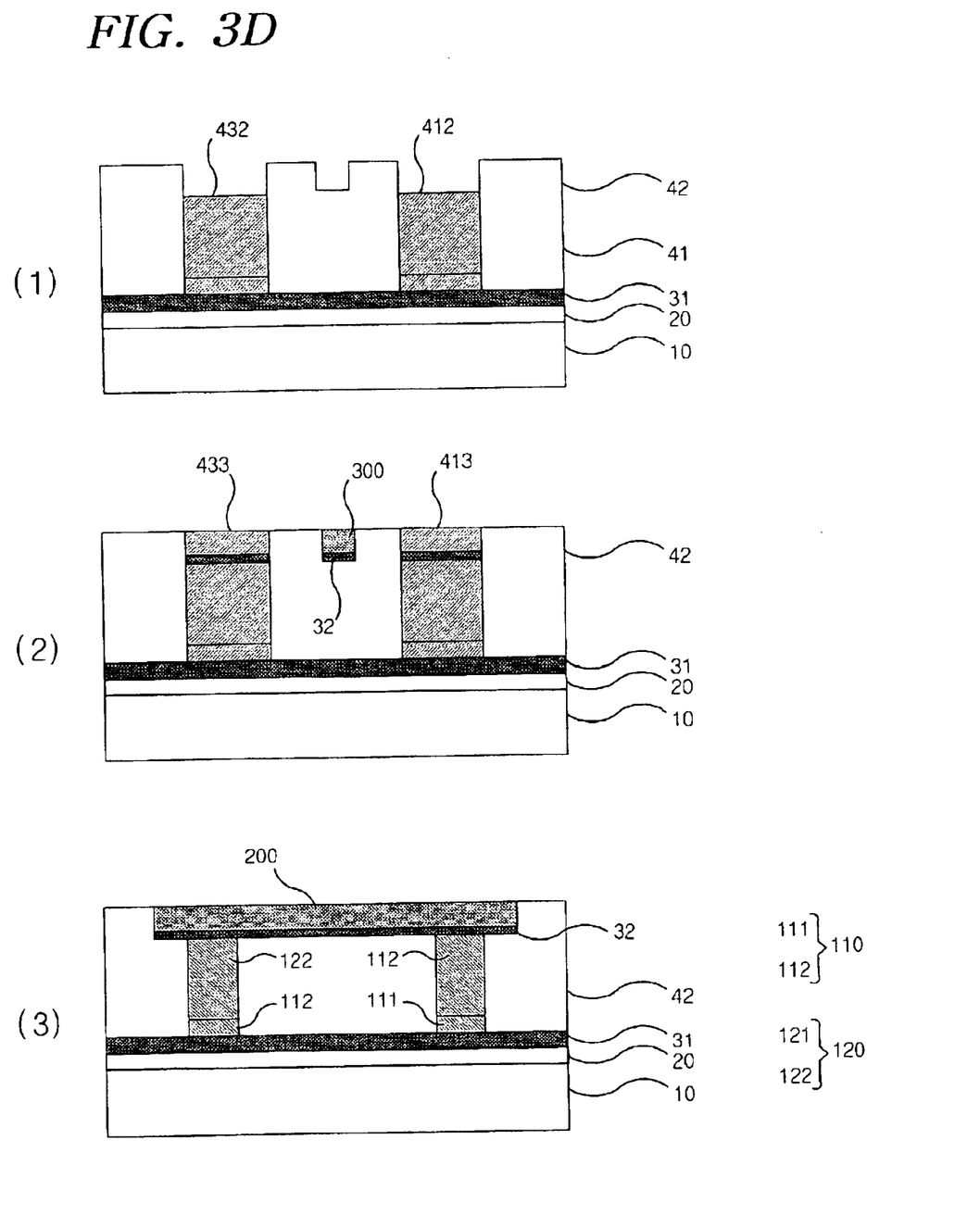
Figure 3E:
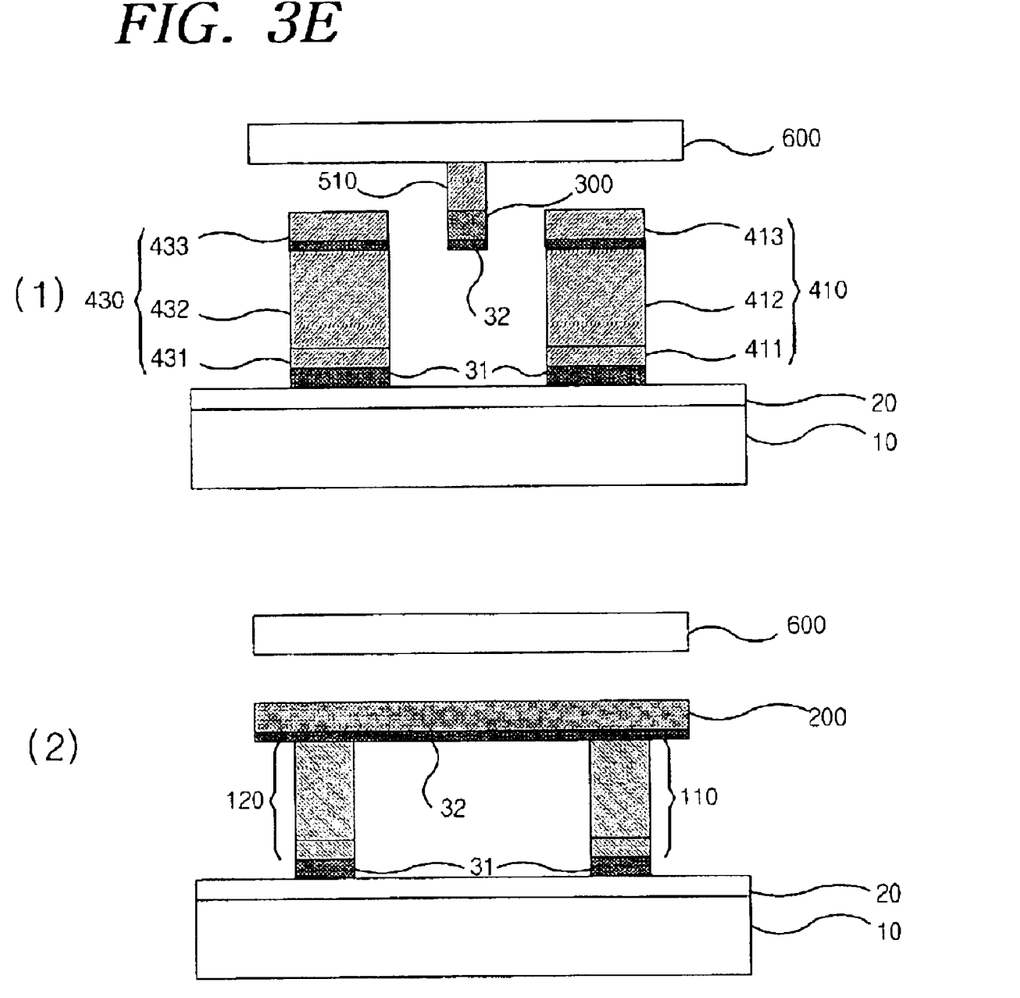

The first electrode layers 411 and 431 are plated, thereby forming the second electrode layers 412 and 432 (in FIG. 3D(1)) in a designated height extended from the first electrode layers 411 and 431. Here, the second lower columns 112 and 122 located on the first lower columns 111 and 121 are plated also (in FIG. 3D(3)). A seed layer 32 is formed throughout the obtained structure, and then ground at unnecessary areas except for the regions of the first torsion bar 200, the second torsion bar 300, and the third electrode layers 413 and 433. Then, the seed layer 32 is plated so that the third electrodes layers 413 and 433, the second torsion bar 300, and the first torsion bar 200 are formed (in FIGS. 3D(2) and (3)).

A thick photoresist layer is coated on the obtained structure and then etched. Then, the upper columns 510 and 520 and the micromirror 600 are formed in sequence by plating using fourth and fifth masks in the same manner as the above plating process using the second and third masks. The above photoresist layer serving as a sacrificial layer is wet-etched, and exposed areas of the seed layer formed on the insulating layer are removed. Thereby, the micromirror actuator in accordance with the present invention is manufactured (in FIGS. 3E(1) and (2)).

Although the above manufacturing method illustrates only two electrodes, the remaining two electrodes are simultaneously formed.

Various metals such as copper or nickel may be used in the above plating.

In case the electrodes 410, 420, 430, and 440 are formed to have a smaller height than the above-described height, the electrodes 410, 420, 430, and 440 comprise only the first electrode layers 411, 431, and etc.

In order to apply voltage to the micromirror actuator or achieve a bonding or probing step for grounding the micromirror actuator, wires are connected from the bottoms of the first electrode layer and the first torsion bar to corresponding pads.

As apparent from the above description, the present invention provides a micromirror actuator, in which a micromirror is elevated to a desired height by means of two upper columns, and the dimensions of its structure are reduced by locating torsion bars under the micromirror.

Further, the micromirror actuator allows the micromirror to be selectively tilted centering on two torsion bars depending on electrodes to which voltage is applied, i.e., with the degrees of freedom of two axes, thus being used as a three-dimensional optical switch.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A micromirror actuator comprising:

a substrate provided with an insulating layer formed thereon;

two lower columns spaced from each other by a designated distance, and formed on the insulating layer;

a first torsion bar extending over upper surfaces of the lower columns;

a second torsion bar formed so that the first and second torsion bars are orthogonal to each other;

four electrodes, each disposed in four areas formed by the orthogonal crossing of the first and second torsion bars, formed on the insulating layer;

two upper columns formed on an upper surface of the second torsion bar so that upper surfaces of the upper columns are located at higher positions than upper surfaces of the electrodes; and a micromirror located on the upper surfaces of the upper columns so that the micromirror is supported by the upper columns.

2. The micromirror actuator as set forth in claim 1, wherein heights of the electrodes or heights of the upper columns are varied according to a desired tilted angle of the micromirror.

3. The micromirror actuator as set forth in claim 1, wherein the first torsion bar, the second torsion bar and the electrodes are made of one selected from the group consisting of copper (Cu), nickel (Ni), and gold (Au).

4. The micromirror actuator as set forth in claim 3, wherein the micromirror is made of one selected from the group consisting of copper (Cu), nickel (Ni), gold (Au), single crystalline silicon, and polycrystalline silicon.

5. The micromirror actuator as set forth in claim 1, wherein the micromirror is made of one selected from the group consisting of copper (Cu), nickel (Ni), gold (Au), single crystalline silicon, and polycrystalline silicon.

6. The micromirror actuator as set forth in claim 1, wherein the upper surfaces of the electrodes are rectangular-shaped, quarter circular-shaped, or fan-shaped.

7. The micromirror actuator as set forth in claim 1, wherein the first and second torsion bars are straight or curved.

* * * * *